US00RE43266E

(19) United States
(12) Reissued Patent
Malcolm et al.

(10) Patent Number: US RE43,266 E
(45) Date of Reissued Patent: Mar. 27, 2012

(54) ROTARY ATTENUATOR AND METHOD OF MAKING IT

(75) Inventors: Bruce G. Malcolm, Indianapolis, IN (US); Michael G. Pazoga, Indianapolis, IN (US); Steven L. Sink, Indianapolis, IN (US)

(73) Assignee: Trilithic, Inc., Indianapolis, IN (US)

(21) Appl. No.: 11/272,483

(22) Filed: Nov. 10, 2005

Related U.S. Patent Documents

Reissue of:
(64) Patent No.: 6,822,530
Issued: Nov. 23, 2004
Appl. No.: 10/432,080
PCT Filed: Nov. 20, 2001
PCT No.: PCT/US01/43204
§ 371 (c)(1),
(2), (4) Date: May 20, 2003
PCT Pub. No.: WO02/45204
PCT Pub. Date: Jun. 6, 2002

U.S. Applications:
(60) Provisional application No. 60/252,531, filed on Nov. 22, 2000.

(51) Int. Cl.
*H01P 1/22* (2006.01)
(52) U.S. Cl. ..... 333/81 A; 327/308
(58) Field of Classification Search ..... 333/81 R, 333/81 A; 327/306, 308
See application file for complete search history.

(56) References Cited

U.S. PATENT DOCUMENTS

| | | | | | |
|---|---|---|---|---|---|
| 3,626,352 | A | | 12/1971 | McColg | |
| 3,786,374 | A | * | 1/1974 | Bergfried | 333/81 A |
| 3,944,962 | A | | 3/1976 | Honda | |
| 3,984,793 | A | * | 10/1976 | Hannaford et al. | 333/81 A |
| 3,999,021 | A | * | 12/1976 | Delp | 200/11 DA |
| 4,001,736 | A | | 1/1977 | Malcolm et al. | |
| 4,490,588 | A | * | 12/1984 | Guenther et al. | 200/11 R |
| 4,493,954 | A | * | 1/1985 | Kimmel et al. | 200/11 R |
| 4,684,905 | A | | 8/1987 | Capek | |
| 4,774,490 | A | * | 9/1988 | Azuchi | 338/160 |
| 5,838,222 | A | | 11/1998 | Al-Rawi | |

FOREIGN PATENT DOCUMENTS

JP 10247602 9/1998

* cited by examiner

*Primary Examiner* — Dinh T. Le
(74) *Attorney, Agent, or Firm* — Barnes & Thornburg LLP

(57) ABSTRACT

An attenuator includes a housing defining an interior, a front, a rear, and a rotor mounted between front and rear for rotation within housing about an axis of the rotor. First electrical contacts are provided on the housing. Second electrical contacts are provided on the rotor. The rotor includes multiple printed conductor boards. Each PC board includes an electrically relatively non-conductive substrate. One side of each substrate provides conductive areas through which electrically attenuating elements of the attenuator are coupled together to form an attenuating network providing a selected level of attenuation. Electrical contact is made between the first electrical contacts and the electrically attenuating elements of the attenuator through the second electrical contacts.

126 Claims, 6 Drawing Sheets

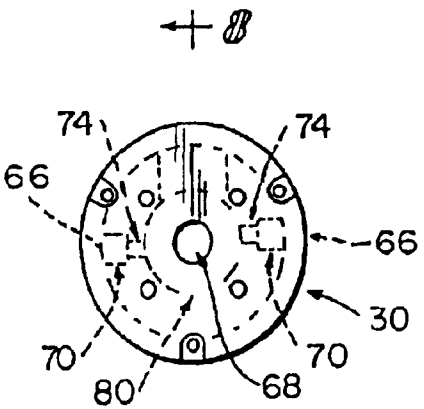
FIG. 7
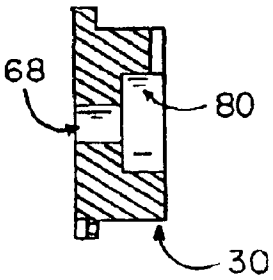
FIG. 8
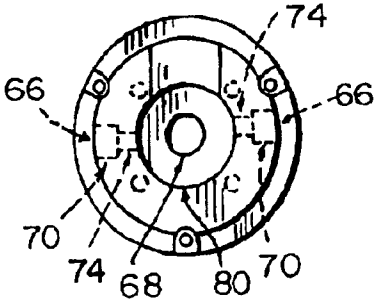
FIG. 9
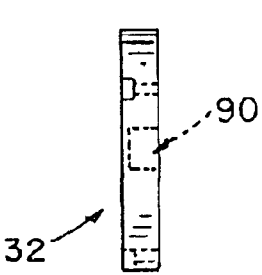
FIG. 10
FIG. 11
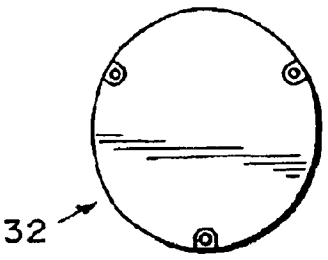
FIG. 12

ROTARY ATTENUATOR AND METHOD OF MAKING IT

Matter enclosed in heavy brackets [ ] appears in the original patent but forms no part of this reissue specification; matter printed in italics indicates the additions made by reissue.

CROSS-REFERENCE TO RELATED APPLICATIONS

This is a regular utility patent application claiming priority to U.S. Ser. No. 60/252,531 filed Nov. 22, 2000, titled Rotary Attenuator, and assigned to the same assignee as this application. The disclosure of U.S. Ser. No. 60/252,531 is hereby incorporated herein by reference.

FIELD OF THE INVENTION

This invention relates to rotary attenuators, and particularly to a robust, inexpensive rotary attenuator and a method of making it. Various types of attenuators are known. There are, for example, the attenuators illustrated and described in the following U.S. Pat. Nos. Re. 29,018; 3,626,352; 3,702,979; 3,750,078; 3,805,209; 3,858,128; 3,984,793; 4,001,736; 4,107,634; 4,117,425; 4,146,853; 4,222,066; 4,684,905; and, 4,695,811. The disclosures of these patents are hereby incorporated herein by reference. No representation is intended by this listing that a complete search of all relevant prior art has been conducted, or that there are no better references than the above listed patents, or that any of the above listed patents is material to patentability. Nor should any such representation be inferred.

BACKGROUND OF THE INVENTION

Rotary attenuators having printed wiring boards are known. The boards of these attenuators are typically constructed from alumina ceramic substrate and like low loss materials. Other rotary attenuators have conductors printed or otherwise provided on low loss ceramic. Some low loss ceramic board attenuators are known whose boards snap into the attenuator body, for example, into the rotor of the attenuator. The ceramic boards and the springs which hold them into the attenuator are rather expensive.

DISCLOSURE OF THE INVENTION

According to the invention, an attenuator includes a housing defining an interior. A rotor is mounted for rotation within the housing about an axis of the rotor. First electrical contacts are provided on the housing. Second electrical contacts are provided on the rotor, along with multiple printed conductor (PC) boards for engaging respective second electrical contacts. Each PC board includes an electrically relatively non-conductive substrate. A first side of each PC board is provided with electrically relatively conductive areas and electrically relatively non-conductive areas. Electrically attenuating elements are coupled together in attenuating networks with the electrically relatively conductive areas. The attenuating networks provide selected levels of attenuation. Electrical contact is selectively made between the first electrical contacts and selected attenuating networks through the second electrical contacts.

Illustratively according to the invention, the interior is generally right circular cylindrical.

Further illustratively according to the invention, the attenuator includes an index for indicating the position of rotor within housing.

Additionally illustratively according to the invention, the attenuator includes a shaft. The rotor includes a passageway for receiving the shaft. The shaft and passageway are provided with complementary features which mate when shaft is received in the passageway.

Illustratively according to the invention, the housing includes a front closure and a rear closure. At least one of the front closure and rear closure is removably attached to the housing.

Further illustratively according to the invention, the rotor includes axially oppositely facing surfaces constructed from electrically relatively non-conductive materials. The second electrical contacts are provided on the axially oppositely facing surfaces.

Additionally illustratively according to the invention, the axially oppositely facing surfaces are surfaces of resin substrates.

Further illustratively according to the invention, the attenuator includes a detent for promoting orientation of the rotor with selected ones of the second electrical contacts in electrical contact with respective first electrical contacts.

Further illustratively according to the invention, the attenuator includes at least one groove in one of the outer perimeter of the rotor and the interior of the housing, and at least one resilient, electrically relatively conductive contact strip oriented in the groove.

Illustratively according to the invention, each PC board further includes a second side which is electrically relatively conductive. One of the electrically relatively conductive areas on the first side of each PC board is electrically coupled to the second side of that respective PC board.

Additionally illustratively according to the invention, the electrically attenuating elements include surface mount resistors.

Illustratively according to the invention, the electrically attenuating elements of the attenuator are coupled between respective conductive areas.

Additionally illustratively according to the invention, the electrically attenuating elements include surface mount resistors.

Illustratively according to the invention, the rotor includes an outer surface provided with slots which extend generally radially and axially of the outer surface. Each slot is wide enough in a circumferential direction around the outer surface of rotor to receive edgewise a respective one of the PC boards.

Further illustratively according to the invention, each PC board includes an electrically relatively conductive side. Multiple strips of resilient electrically conductive material capture the radially inner edges of respective PC boards. The respective strips of resilient electrically conductive material make electrical contact with the electrically relatively conductive side of a respective respective PC board, with one of the conductive areas of a respective PC board, and with the rotor.

Additionally illustratively according to the invention, each electrically relatively non-conductive substrate includes fiber reinforced resin.

Illustratively according to the invention, the resin is fiber reinforced.

Further illustratively according to the invention, the electrically relatively non-conductive substrate includes fiber reinforced resin.

Additionally illustratively according to the invention, the fiber reinforced resin is fiberglass.

Illustratively according to the invention, the attenuator housing is constructed from extruded aluminum.

Further illustratively according to the invention, the attenuator housing is constructed from aluminum tubing.

BRIEF DESCRIPTION OF THE DRAWINGS

The invention may best be understood by referring to the following detailed description and accompanying drawings which illustrate the invention. In the drawings:

FIG. 7 illustrates an end elevational view of a component of the attenuator illustrated in FIGS. 1-3;

FIG. 8 illustrates a sectional side elevational view of the component illustrated in FIG. 7, taken generally along section lines 8-8 of FIG. 7;

FIG. 9 illustrates an end elevational view of the other end of the component, an end view of which is illustrated in FIG. 7;

FIG. 10 illustrates an end elevational view of a component of the attenuator illustrated in FIGS. 1-3;

FIG. 11 illustrates a side elevational view of the component illustrated in FIG. 10;

FIG. 12 illustrates an end elevational view of the other end of the component, an end view of which is illustrated in FIG. 10;

DETAILED DESCRIPTION OF AN ILLUSTRATIVE EMBODIMENT

Figure 1:
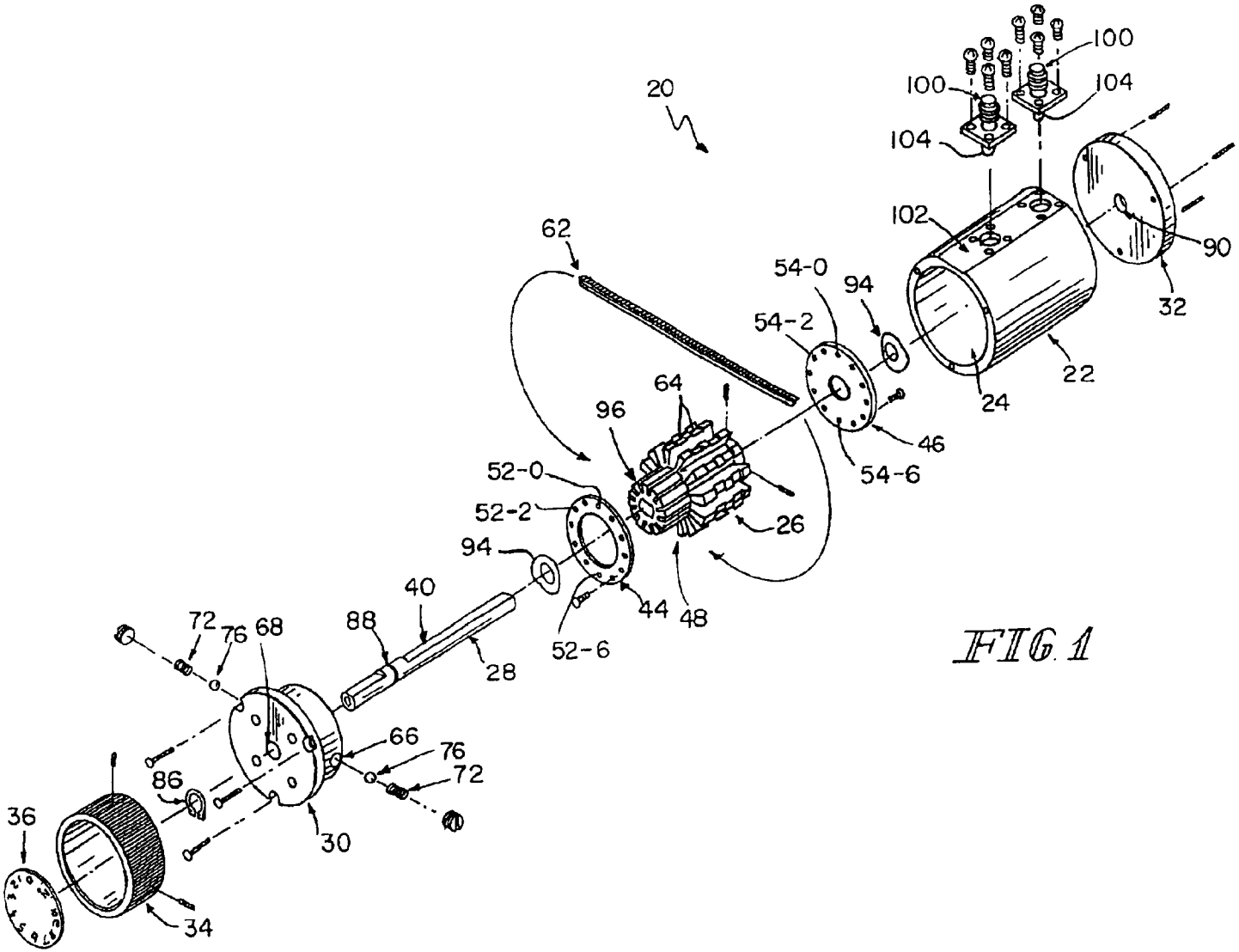
FIG. 1 illustrates an exploded perspective view of an attenuator constructed according to the invention.
Figure 3:
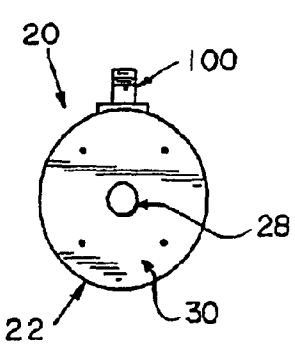
FIG. 3 illustrates an end elevational view of the attenuator illustrated in FIGS. 1-2.
Figure 2:
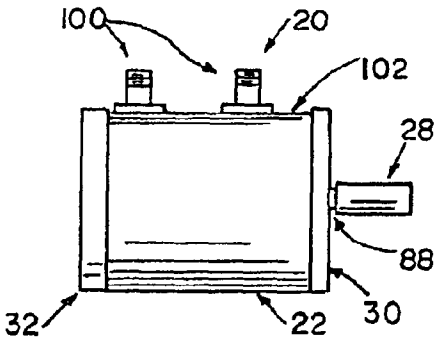
FIG. 2 illustrates a side elevational view of the attenuator illustrated in FIG. 1.
Figure 6:
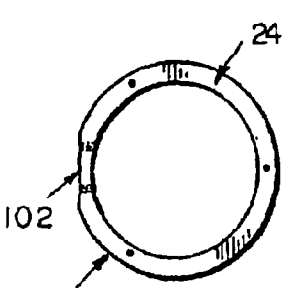
FIG. 6 illustrates an end elevational view of the other end of the component, an end view of which is illustrated in FIG. 4.
Figure 5:
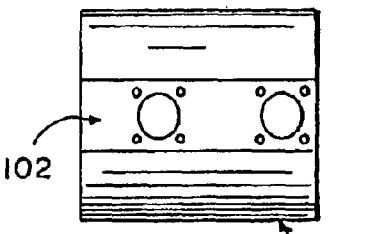
FIG. 5 illustrates a side elevational view of the component illustrated in FIG. 4.
Figure 4:
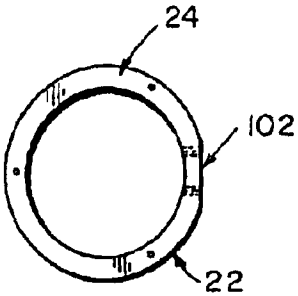
FIG. 4 illustrates an end elevational view of a component of the attenuator illustrated in FIGS. 1-3.
Figure 13:
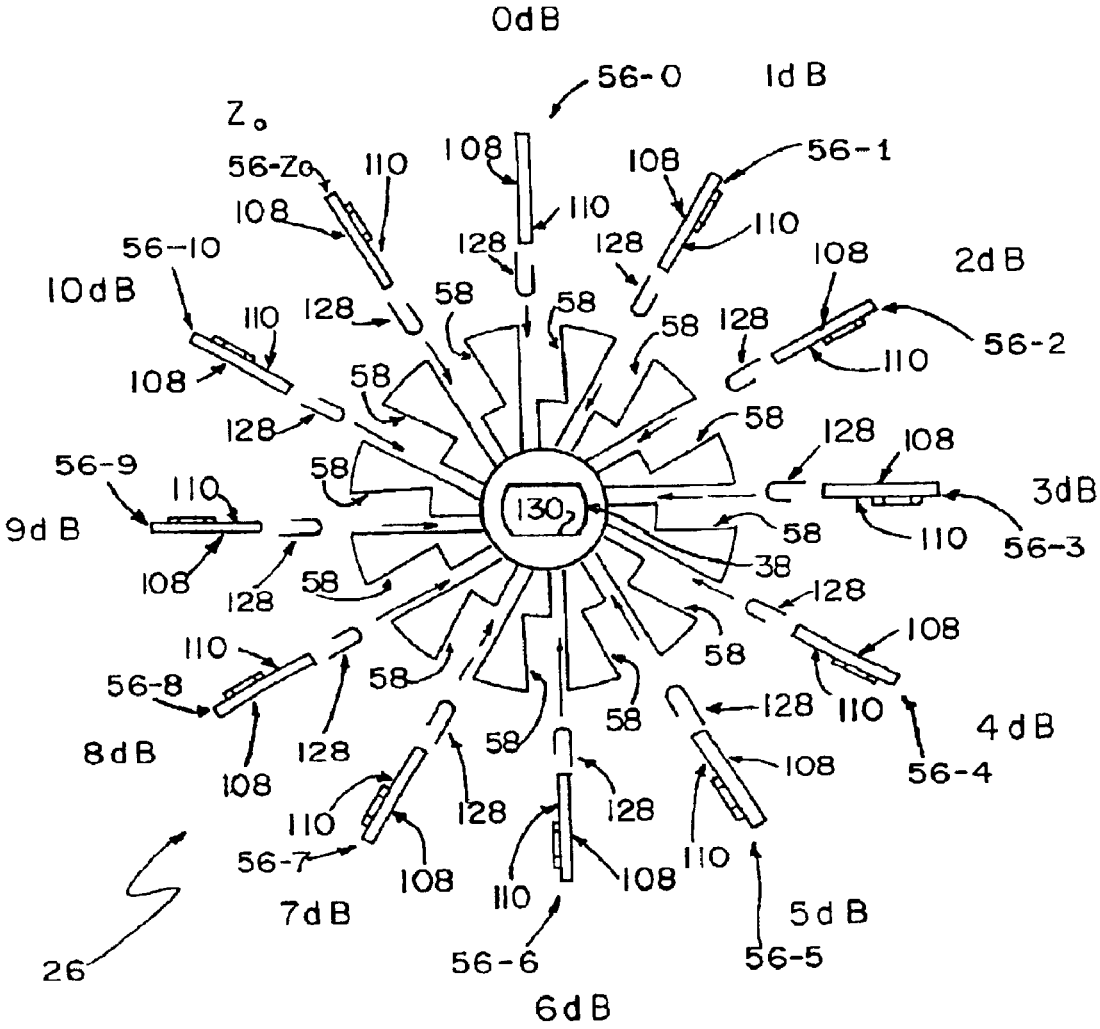
FIG. 13 illustrates an end elevational view of a component of the attenuator illustrated in FIGS. 1-3.
Figure 14A:
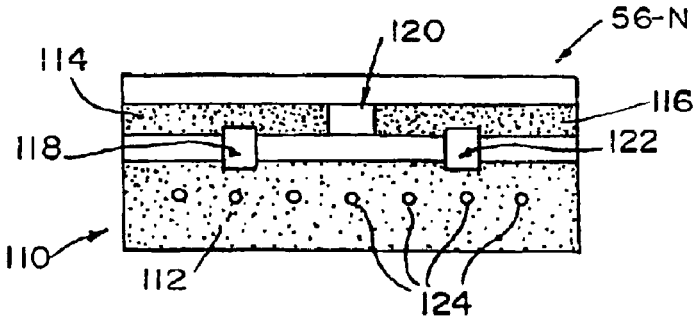
FIGS. 14A-B illustrate side elevational views of components of the attenuator illustrated in FIGS. 1-3.
Figure 14B:
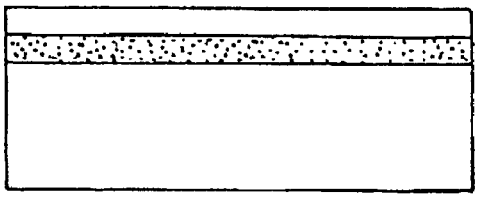
Figure 15:
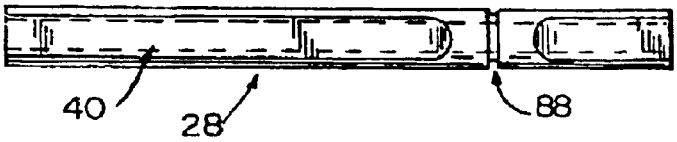
FIG. 15 illustrates a top plan view of a component of the attenuator illustrated in FIGS. 1-3.
Figure 16:
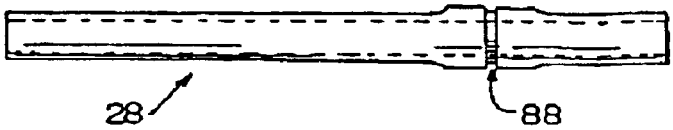
FIG. 16 illustrates a side elevational view of the component illustrated in FIG. 15.
Figure 17:
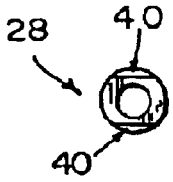
FIG. 17 illustrates an end elevational view of the component illustrated in FIGS. 15-16.
Figure 19:
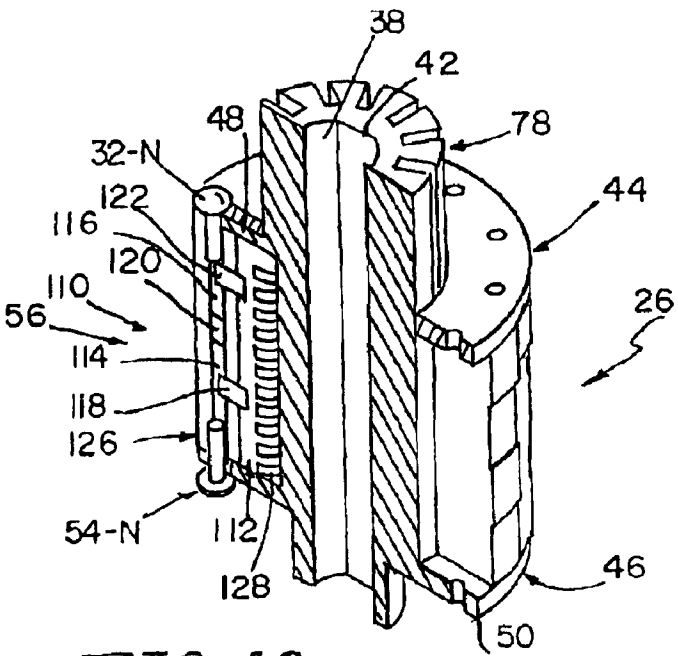
Figure 18:
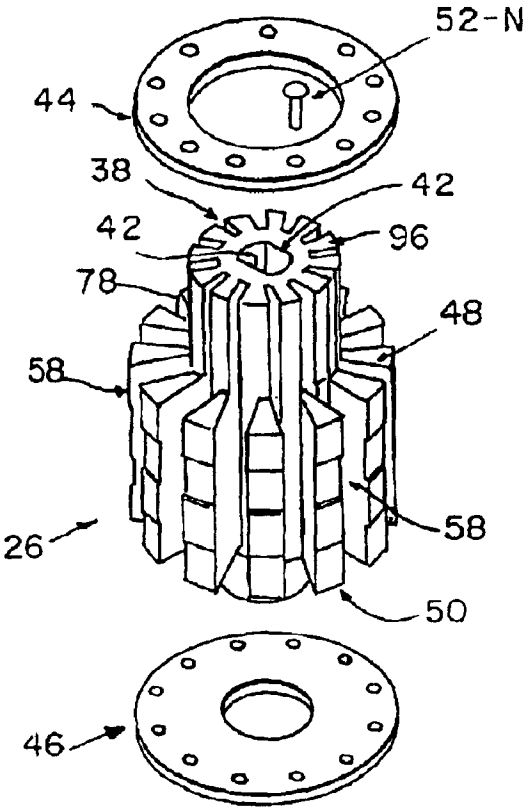
FIG. 18 illustrates a perspective view of certain components of the attenuator illustrated in FIGS. 1-3 during a stage of assembly; and, FIG. 19 illustrates a sectional perspective view of certain components of the attenuator illustrated in FIGS. 1-3 during a stage of assembly subsequent to the stage illustrated in FIG. 18.

As used in this application, terms such as "electrically relatively conductive" and "electrically relatively non-insulative" refer to a broad range of conductivities electrically more conductive than materials described as "electrically relatively non-conductive" and "electrically relatively insulative." Terms such as "electrically semiconductive" refer to a broad range of conductivities between electrically relatively conductive and electrically relatively non-conductive.

FR 4 is a fairly ubiquitous, non-low loss, epoxy resin-impregnated fiberglass. However, since the present application proposes to use it in rotary attenuators, its loss characteristics are relatively inconsequential. The present application also proposes to use relatively inexpensive attenuator housing, front cover, back cover and rotor components, such as, for example, die cast zinc. The attenuator housing can even be constructed from, for example, extruded aluminum tubing. Additional cost savings are realized by employing solderless, snap-in technology to attach the boards to the rotor. Of course, the attenuator resistors need to be soldered to the board, but this is the case with many types of attenuator boards known in the art. Attenuators according to the present invention have been constructed having various step attenuation values, for example, 0-100 dB in 10 dB increments and 0-10 dB in 1 dB increments.

Turning now to the drawings, an attenuator 20 includes a housing 22 defining a generally right circular cylindrical interior 24. A rotor 26 is mounted on a shaft 28 rotatably journalled in a front cover 30 and a rear cover 32 for rotation within housing 22 by rotation by an operator of a knob 34 mounted on the end of shaft 28 which projects through front cover 30. Knob 34 may be provided with a suitable index 36 to the position of rotor 26 within housing 22. The shaft 28 and a central passageway 38 through rotor 26 can be provided with complementary features 40, 42, such as flats, a longitudinally extending tongue and groove, or the like, which mate when shaft 28 is inserted through passageway 38 to insure that rotation of shaft 28 causes rotation of rotor 26.

Rotor 26 front 44 and back 46 plates, respectively, are provided on the axially facing front and back surfaces 48, 50, respectively, of rotor 26. Plates 44, 46 are constructed from electrically non-conductive materials such as thin sheets of fiber reinforced resin or the like, but are provided with electrical contacts 52-0, 52-1, 52-2, . . . 52-10, 52-$Z_0$, 54-0, 54-1, 54-2, . . . 54-10, 54-$Z_0$, respectively, through which electrical contact is made to electrical traces on printed circuit (hereinafter sometimes PC) boards 56-0, 56-1, 56-2, . . . 56-10, 56-$Z_0$, respectively, mounted in respective slots 58 on rotor 26, as will be discussed later. Electrical contact between the body of rotor 26 and housing 22 is promoted by spring finger contact strips 62 (only one of which is illustrated in FIG. 1 for purposes of clarity), known in the art, which are oriented in grooves 64 around the circumference of rotor 26.

Front cover 30 is provided with two radial bores 66 which are oriented generally diametrically opposite one another with respect to the bore 68 for receiving the shaft 28. Each of bores 66 includes a larger diameter region 70 for housing a detent spring 72 and a smaller diameter region 74 for housing a detent ball 76. A smaller diameter forward region 78 of rotor 26 is received in a somewhat cup-like enlarged rear region 80 of the bore 68. This cup-like region 80 intersects the bores 66, so that the detent balls 76 engage the forward extensions of radially and axially extending grooves 58 formed in rotor 26 to receive respective ones of the PC boards 56-0, 56-1, 56-2, . . . 56-10, 56-$Z_0$.

The rotor 26 and shaft 28 assembly is captured axially in housing 22 by sliding the assembled front cover 30 on the shaft 28, snapping a locking ring 86 into a circumferential groove 88 on shaft 28, and mounting the front cover 30 on the housing 22, illustratively using threaded fasteners. The shaft 28 is then inserted into a blind shaft-receiving bore 90 in the rear cover 32, and the rear cover 32 is mounted on the housing 22, again, illustratively, using threaded fasteners. Spring tension washers 94 may be provided between each end of rotor 26 and the adjacent face 96, 50 of the rotor 26, respectively, to help position the rotor 26 in the housing 22 and promote rotation of it.

Means are provided for making electrical contact with the PC boards 56-0, 56-1, 56-2, . . . 56-10, 56-$Z_0$ carrying the various attenuator combinations. In the illustrated embodiment, these means include two coaxial connectors 100 mounted on a flat 102 provided for this purpose on the outside of housing 22. Spring wiper blades 104 electrically connected to the center contacts (not shown) of respective ones of these connectors 100 are configured to contact respective electrical contacts 52-0, 52-1, 52-2, . . . 52-10, 52-$Z_0$, 54-0, 54-1, 54-2, . . . 54-10, 54-$Z_0$, when the action of the detents 58, 66, 70, 72, 74, 76 stops rotation of the rotor 26 with those contacts 52-0, 52-1, 52-2, . . . 52-10, 52-$Z_0$, 54-0, 54-1, 54-2, . . . 54-10, 54-$Z_0$, in positions to be contacted by wiper blades 104. Coaxial connectors 100 are also mounted to housing 22 by suitable means, illustratively, threaded fasteners, which insures the electrical connection of the outer conductors of connectors 100 with housing 22, and components electrically connected to housing 22.

Turning now to the configuration of PC boards 56-0, 56-1, 56-2, . . . 56-10, 56-$Z_0$, and their assembly into rotor 26, each PC board 56-0, 56-1, 56-2, . . . 56-10, 56-$Z_0$ includes a side 108 which is metallized to provide a ground plane and a circuit trace side 110 which is only partially metallized to provide the conductive pads 112, 114, 116 by which the resistors 118, 120, 122 which form the various stages of attenuation provided by the network 112, 114, 116, 118, 120, 122 are coupled together in an attenuating network 112, 114, 116, 118, 120, 122 configuration. One, 112, of the conductive pads 112, 114, 116 is coupled by plated through holes 124 to the ground plane on the other side 108 of the PC board 56-0, 56-1, 56-2, . . . 56-10, 56-$Z_0$. The other two conductive pads 114, 116 are soldered to the shanks 126 of respective contacts 52-0, 52-1, 52-2, . . . 52-10, 52-$Z_0$, 54-0, 54-1, 54-2, . . . 54-10, 54-$Z_0$ on the front and back plates 44, 46, respectively. Chip resistors 118 are connected, for example, by soldering, to pads 112 and 114 of each PC board 56 to complete the various selectable attenuating networks 112-0, 114-0, 116-0, 118-0, 120-0, 122-0, 112-1, 114-1, 116-1, 118-1, 120-1, 122-1, 112-2, 114-2, 116-2, 118-2, 120-2, 122-2, . . . 112-10, 114-10, 116-10, 118-10, 120-10, 122-10, 112-$Z_0$, 114-$Z_0$, 116-$Z_0$, 118-$Z_0$, 120-$Z_0$, 122-$Z_0$. Chip resistors 120 are connected between pads 114 and 116 of each PC board 56. Chip resistors 122 are connected between pads 112 and 116 of each PC board 56. Illustrative resistance values in ohms to permit selection of attenuations from 0 dB to 10 dB or to terminate both of connectors 100 with ~50 Ω impedances are illustrated in the following table.

| Attenuation in dB | Value of resistor 118 in ohms | Value of resistor 120 ohms | Value of resistor 122 in ohms |
|---|---|---|---|
| 0 | N/A | N/A | N/A |
| 1 | 866 | 5.62 | 866 |
| 2 | 432 | 11.5 | 432 |
| 3 | 294 | 17.8 | 294 |
| 4 | 221 | 23.7 | 221 |
| 5 | 178 | 30.1 | 178 |
| 6 | 150 | 37.4 | 150 |
| 7 | 130 | 44.2 | 130 |
| 8 | 115 | 52.3 | 115 |
| 9 | 105 | 61.9 | 105 |
| 10 | 95.3 | 71.5 | 95.3 |
| $Z_o$ | 49.9 | ∞ | 49.9 |

During assembly of the various PC boards 56-0, 56-1, 56-2, . . . 56-10, 56-$Z_0$ into respective slots 58 on rotor 26, several segments 128 of spring finger contact strip 62 material are broken from a strip and are slipped over what will become the radially innermost edge of each PC board 56-0, 56-1, 56-2, . . . 56-10, 56-$Z_0$, so that the segments make good electrical contact with the ground planes on sides 108 of PC boards 56-0, 56-1, 56-2, . . . 56-10, 56-$Z_0$, with pads 112 on the opposite sides of PC boards 56-0, 56-1, 56-2, . . . 56-10, 56-$Z_0$, and with rotor 26. Then, using a zero indicator mark 130 on rotor 26 for orientation, the various PC boards 56-0, 56-1, 56-2, . . . 56-10, 56-$Z_0$ are pressed into their respective slots 58 in rotor 26.

What is claimed is:

1. An attenuator including a housing defining an interior, a rotor mounted for rotation within the housing about an axis of the rotor, first electrical contacts provided on the housing, second electrical contacts being provided on the rotor, and multiple printed conductor (PC) boards for engaging respective second electrical contacts, each PC board including an electrically relatively non-conductive substrate, a first side of each PC board providing electrically relatively conductive areas and electrically relatively non-conductive areas, electrically attenuating elements coupled together in attenuating networks with the electrically relatively conductive areas, the attenuating networks providing selected levels of attenuation, electrical contact being selectively made between the first electrical contacts and selected attenuating networks through the second electrical contacts.

2. The apparatus of claim 1 wherein the interior is generally right circular cylindrical.

3. The apparatus of claim 1 further including an index for indicating the position of *the* rotor within *the* housing.

4. The apparatus of claim 1 further including a shaft, the rotor including a passageway for receiving the shaft, the shaft and passageway being provided with complementary features which mate when the shaft is received in the passageway.

5. The apparatus of claim 1 wherein the housing includes a front closure and a rear closure, at least one of the front closure and rear closure being removably attached to the housing.

6. The apparatus of claim 1 wherein the rotor includes axially oppositely facing surfaces constructed from electrically relatively non-conductive materials, the second electrical contacts being provided on the axially oppositely facing surfaces.

7. The apparatus of claim 6 wherein the axially oppositely facing surfaces are surfaces of resin substrates.

8. The apparatus of claim 6 further including a detent for promoting orientation of the rotor with selected ones of the second electrical contacts in electrical contact with respective ones of the first electrical contacts.

9. The apparatus of claim 1 further including at least one groove in one of the outer perimeter of the rotor and the interior of the housing, and at least one resilient, electrically relatively conductive contact strip oriented in the groove.

10. The apparatus of claim 1 wherein each PC board further includes a second side which is electrically relatively conductive, one of the electrically relatively conductive areas on the first side of each PC board being electrically coupled to the second side of that respective PC board.

11. The apparatus of claim 1 wherein the electrically attenuating elements include surface mount resistors.

12. The apparatus of claim 1 wherein the electrically attenuating elements of the attenuator are coupled between respective conductive areas.

13. The apparatus of claim 12 wherein the electrically attenuating elements include surface mount resistors.

14. The apparatus of claim 1 wherein the rotor includes an outer surface provided with slots which extend generally radially and axially of the outer surface, each slot being wide enough in a circumferential direction around the outer surface of *the* rotor to receive edgewise a respective one of the PC boards.

15. The apparatus of claim 14 wherein each PC board further includes an electrically relatively conductive side and further including multiple strips of resilient electrically conductive material, each strip capturing the radially inner edge of a respective PC board and making electrical contact with *the* electrically relatively conductive side of each PC board, with one of the conductive areas of each PC board, and with the rotor.

16. The apparatus of claim 14 wherein the electrically relatively non-conductive substrate includes resin.

17. The apparatus of claim 16 wherein the electrically relatively non-conductive substrate includes fiber reinforced resin.

18. The apparatus of claim 1 wherein the electrically relatively non-conductive substrate includes fiber reinforced resin.

19. The apparatus of claim 18 wherein the fiber reinforced resin is fiberglass.

20. The apparatus of claim 1 wherein the attenuator housing is constructed from extruded aluminum.

21. The apparatus of claim 1 wherein the attenuator housing is constructed from aluminum tubing.

*22. The apparatus of claim 1 wherein the rotor is constructed from zinc.*

*23. The apparatus of claim 22 wherein the rotor is constructed from die cast zinc.*

*24. The apparatus of claim 1 wherein the rotor is die cast.*

*25. The apparatus of claim 2 wherein the rotor is constructed from zinc.*

*26. The apparatus of claim 25 wherein the rotor is constructed from die cast zinc.*

*27. The apparatus of claim 2 wherein the rotor is die cast.*

*28. The apparatus of claim 3 wherein the rotor is constructed from zinc.*

*29. The apparatus of claim 28 wherein the rotor is constructed from die cast zinc.*

*30. The apparatus of claim 3 wherein the rotor is die cast.*

*31. The apparatus of claim 4 wherein the rotor is constructed from zinc.*

*32. The apparatus of claim 31 wherein the rotor is constructed from die cast zinc.*

*33. The apparatus of claim 4 wherein the rotor is die cast.*

*34. The apparatus of claim 5 wherein the rotor is constructed from zinc.*

*35. The apparatus of claim 34 wherein the rotor is constructed from die cast zinc.*

*36. The apparatus of claim 5 wherein the rotor is die cast.*

*37. The apparatus of claim 6 wherein the rotor is constructed from zinc.*

*38. The apparatus of claim 37 wherein the rotor is constructed from die cast zinc.*

*39. The apparatus of claim 6 wherein the rotor is die cast.*

*40. The apparatus of claim 7 wherein the rotor is constructed from zinc.*

*41. The apparatus of claim 40 wherein the rotor is constructed from die cast zinc.*

*42. The apparatus of claim 7 wherein the rotor is die cast.*

*43. The apparatus of claim 8 wherein the rotor is constructed from zinc.*

*44. The apparatus of claim 43 wherein the rotor is constructed from die cast zinc.*

*45. The apparatus of claim 8 wherein the rotor is die cast.*

*46. The apparatus of claim 9 wherein the rotor is constructed from zinc.*

*47. The apparatus of claim 46 wherein the rotor is constructed from die cast zinc.*

*48. The apparatus of claim 9 wherein the rotor is die cast.*

*49. The apparatus of claim 10 wherein the rotor is constructed from zinc.*

*50. The apparatus of claim 49 wherein the rotor is constructed from die cast zinc.*

*51. The apparatus of claim 10 wherein the rotor is die cast.*

*52. The apparatus of claim 11 wherein the rotor is constructed from zinc.*

*53. The apparatus of claim 52 wherein the rotor is constructed from die cast zinc.*

*54. The apparatus of claim 11 wherein the rotor is die cast.*

*55. The apparatus of claim 12 wherein the rotor is constructed from zinc.*

*56. The apparatus of claim 55 wherein the rotor is constructed from die cast zinc.*

*57. The apparatus of claim 12 wherein the rotor is die cast.*

*58. The apparatus of claim 13 wherein the rotor is constructed from zinc.*

*59. The apparatus of claim 58 wherein the rotor is constructed from die cast zinc.*

*60. The apparatus of claim 13 wherein the rotor is die cast.*

*61. The apparatus of claim 14 wherein the rotor is constructed from zinc.*

*62. The apparatus of claim 61 wherein the rotor is constructed from die cast zinc.*

*63. The apparatus of claim 14 wherein the rotor is die cast.*

*64. The apparatus of claim 15 wherein the rotor is constructed from zinc.*

*65. The apparatus of claim 64 wherein the rotor is constructed from die cast zinc.*

*66. The apparatus of claim 15 wherein the rotor is die cast.*

*67. The apparatus of claim 16 wherein the rotor is constructed from zinc.*

*68. The apparatus of claim 67 wherein the rotor is constructed from die cast zinc.*

*69. The apparatus of claim 16 wherein the rotor is die cast.*

*70. The apparatus of claim 17 wherein the rotor is constructed from zinc.*

*71. The apparatus of claim 70 wherein the rotor is constructed from die cast zinc.*

*72. The apparatus of claim 17 wherein the rotor is die cast.*

*73. The apparatus of claim 18 wherein the rotor is constructed from zinc.*

*74. The apparatus of claim 73 wherein the rotor is constructed from die cast zinc.*

*75. The apparatus of claim 18 wherein the rotor is die cast.*

*76. The apparatus of claim 19 wherein the rotor is constructed from zinc.*

*77. The apparatus of claim 76 wherein the rotor is constructed from die cast zinc.*

*78. The apparatus of claim 19 wherein the rotor is die cast.*

*79. The apparatus of claim 20 wherein the rotor is constructed from zinc.*

*80. The apparatus of claim 79 wherein the rotor is constructed from die cast zinc.*

*81. The apparatus of claim 20 wherein the rotor is die cast.*

*82. The apparatus of claim 21 wherein the rotor is constructed from zinc.*

*83. The apparatus of claim 82 wherein the rotor is constructed from die cast zinc.*

*84. The apparatus of claim 21 wherein the rotor is die cast.*

*85. A method of making an attenuator comprising providing a housing defining an interior, mounting a rotor for rotation within the housing about an axis of the rotor, providing first electrical contacts on the housing, providing second electrical contacts on the rotor, and providing multiple printed conductor (PC) boards for engaging respective second electrical contacts, mounting the rotor for rotation within the housing including mounting a die cast rotor for rotation within the housing, the providing of the multiple PC boards includes providing on each PC board an electrically relatively non-conductive substrate, providing on a first side of each PC board electrically relatively conductive areas and electrically relatively non-conductive areas, and coupling electrically attenuating elements together in attenuating networks with the electrically relatively conductive areas to provide selected levels of attenuation.*

*86. The method of claim 85 wherein the providing of the housing defining the interior comprises providing a housing defining a generally right circular cylindrical interior.*

*87. The method of claim 85 further including providing an index for indicating the position of the rotor within the housing.*

*88. The method of claim 85 further including providing a shaft, and mounting the rotor for rotation within the housing about an axis of the rotor includes providing a passageway through the rotor for receiving the shaft and providing on the shaft and passageway complementary features which mate when the shaft is received in the passageway.*

*89. The method of claim 85 wherein the providing of the housing defining the interior includes providing a front closure and a rear closure, and removably attaching at least one of the front closure and rear closure to the housing.*

*90. The method of claim 85 wherein the mounting of the rotor for rotation within the housing about the axis of the rotor includes providing on the rotor axially oppositely facing surfaces constructed from electrically relatively non-conductive materials, and providing second electrical contacts on the rotor includes providing the second electrical contacts on the axially oppositely facing surfaces.*

*91. The method of claim 90 wherein the providing on the rotor of axially oppositely facing surfaces constructed from electrically relatively non-conductive materials includes providing on the rotor axially oppositely facing resin surfaces.*

*92. The method of claim 85 further including providing a detent for promoting orientation of the rotor with selected ones of the second electrical contacts in electrical contact with respective ones of the first electrical contacts.*

*93. The method of claim 85 further including providing at least one groove in one of the outer perimeter of the rotor and the interior of the housing, and at least one resilient, electrically relatively conductive contact strip oriented in the groove.*

*94. The method of claim 85 wherein the providing of the multiple PC boards includes providing multiple PC boards, each of which includes a second side which is electrically relatively conductive, and coupling one of the electrically relatively conductive areas on the first side of each PC board to the second side of that respective PC board.*

*95. The method of claim 85 wherein the coupling of the electrically attenuating elements together in attenuating networks with the electrically relatively conductive areas to provide selected levels of attenuation includes coupling surface mount resistors together in attenuating networks with the electrically relatively conductive areas to provide selected levels of attenuation.*

*96. The method of claim 85 wherein the coupling of the electrically attenuating elements together in attenuating networks with the electrically relatively conductive areas to provide selected levels of attenuation includes coupling the electrically attenuating elements of the attenuator between respective conductive areas.*

*97. The method of claim 96 wherein the coupling of the electrically attenuating elements together in attenuating networks with the electrically relatively conductive areas to provide selected levels of attenuation includes coupling surface mount resistors together in attenuating networks with the electrically relatively conductive areas to provide selected levels of attenuation.*

*98. The method of claim 85 wherein the mounting of the rotor for rotation within the housing includes providing on an outer surface of the rotor slots which extend generally radially and axially of the outer surface, each slot being wide enough in a circumferential direction around the outer surface of the rotor to receive edgewise a respective one of the PC boards.*

*99. The method of claim 85 wherein the providing of multiple PC boards for engaging respective second electrical contacts includes providing on each PC board an electrically relatively conductive side and providing multiple strips of resilient electrically conductive material, capturing with each strip the radially inner edge of a respective PC board and making electrical contact with the electrically relatively conductive side of each PC board, with one of the conductive areas of each PC board, and with the rotor.*

*100. The method of claim 85 wherein the providing on each PC board of the electrically relatively non-conductive substrate includes providing on each PC board a resin substrate.*

*101. The method of claim 100 wherein the providing on each PC board of the resin substrate includes providing on each PC board a fiber reinforced resin substrate.*

*102. The method of claim 85 wherein the providing on each PC board of the electrically relatively non-conductive substrate includes providing on each PC board a fiber reinforced resin substrate.*

*103. The method of claim 102 wherein the providing on each PC board of the fiber reinforced resin substrate includes providing on each PC board a fiberglass substrate.*

*104. The method of claim 85 wherein the providing of the housing defining an interior includes providing a housing constructed from extruded aluminum.*

*105. The method of claim 85 wherein the providing of the housing defining the interior includes providing a housing constructed from aluminum tubing.*

*106. The method of claim 85 wherein the mounting of the die cast rotor for rotation within the housing about the axis of the rotor includes mounting a die cast zinc-containing rotor for rotation within the housing about an axis of the rotor.*

*107. The method of claim 86 wherein the mounting of the die cast rotor for rotation within the housing about the axis of the rotor includes mounting a die cast zinc-containing rotor for rotation within the housing about an axis of the rotor.*

*108. The method of claim 87 wherein the mounting of the die cast rotor for rotation within the housing about the axis of the rotor includes mounting a die cast zinc-containing rotor for rotation within the housing about an axis of the rotor.*

*109. The method of claim 88 wherein the mounting of the die cast rotor for rotation within the housing about the axis of the rotor includes mounting a die cast zinc-containing rotor for rotation within the housing about an axis of the rotor.*

*110. The method of claim 89 wherein the mounting of the die cast rotor for rotation within the housing about the axis of the rotor includes mounting a die cast zinc-containing rotor for rotation within the housing about an axis of the rotor.*

*111. The method of claim 90 wherein the mounting of the die cast rotor for rotation within the housing about the axis of the rotor includes mounting a die cast zinc-containing rotor for rotation within the housing about an axis of the rotor.*

*112. The method of claim 91 wherein the mounting of the die cast rotor for rotation within the housing about the axis of the rotor includes mounting a die cast zinc-containing rotor for rotation within the housing about an axis of the rotor.*

*113. The method of claim 92 wherein the mounting of the die cast rotor for rotation within the housing about the axis of the rotor includes mounting a die cast zinc-containing rotor for rotation within the housing about an axis of the rotor.*

*114. The method of claim 93 wherein the mounting of the die cast rotor for rotation within the housing about the axis of the rotor includes mounting a die cast zinc-containing rotor for rotation within the housing about an axis of the rotor.*

*115. The method of claim 94 wherein the mounting of the die cast rotor for rotation within the housing about the axis of the rotor includes mounting a die cast zinc-containing rotor for rotation within the housing about an axis of the rotor.*

*116. The method of claim 95 wherein the mounting of the die cast rotor for rotation within the housing about the axis of the rotor includes mounting a die cast zinc-containing rotor for rotation within the housing about an axis of the rotor.*

*117. The method of claim 96 wherein the mounting of the die cast rotor for rotation within the housing about the axis of the rotor includes mounting a die cast zinc-containing rotor for rotation within the housing about an axis of the rotor.*

*118. The method of claim 97 wherein the mounting of the die cast rotor for rotation within the housing about the axis of the rotor includes mounting a die cast zinc-containing rotor for rotation within the housing about an axis of the rotor.*

*119. The method of claim 98 wherein the mounting of the die cast rotor for rotation within the housing about the axis of the rotor includes mounting a die cast zinc-containing rotor for rotation within the housing about an axis of the rotor.*

*120. The method of claim 99 wherein the mounting of the die cast rotor for rotation within the housing about the axis of the rotor includes mounting a die cast zinc-containing rotor for rotation within the housing about an axis of the rotor.*

*121. The method of claim 100 wherein the mounting of the die cast rotor for rotation within the housing about the axis of the rotor includes mounting a die cast zinc-containing rotor for rotation within the housing about an axis of the rotor.*

*122. The method of claim 101 wherein the mounting of the die cast rotor for rotation within the housing about the axis of the rotor includes mounting a die cast zinc-containing rotor for rotation within the housing about an axis of the rotor.*

*123. The method of claim 102 wherein the mounting of the die cast rotor for rotation within the housing about the axis of the rotor includes mounting a die cast zinc-containing rotor for rotation within the housing about an axis of the rotor.*

*124. The method of claim 103 wherein the mounting of the die cast rotor for rotation within the housing about the axis of the rotor includes mounting a die cast zinc-containing rotor for rotation within the housing about an axis of the rotor.*

*125. The method of claim 104 wherein the mounting of the die cast rotor for rotation within the housing about the axis of the rotor includes mounting a die cast zinc-containing rotor for rotation within the housing about an axis of the rotor.*

*126. The method of claim 105 wherein the mounting of the die cast rotor for rotation within the housing about the axis of the rotor includes mounting a die cast zinc rotor for rotation within the housing about an axis of the rotor.*

* * * * *